United States Patent [19]

Senda et al.

[11] Patent Number: 4,968,723

[45] Date of Patent: Nov. 6, 1990

[54] PRE-EXPANDED PARTICLES OF NON-CROSSLINKED LINEAR LOW DENSITY POLYETHYLENE

[75] Inventors: Kenichi Senda, Hirakata; Masao Ando, Toyonaka; Hirofumi Maeda, Takatsuki, all of Japan

[73] Assignee: Kanegafuchi Kagaku Kogyo Kabushiki Kaisha, Osaka, Japan

[21] Appl. No.: 257,113

[22] Filed: Oct. 13, 1988

Related U.S. Application Data

[62] Division of Ser. No. 143,301, Jan. 11, 1988, abandoned, which is a division of Ser. No. 880,448, Jun. 30, 1986, abandoned.

[30] Foreign Application Priority Data

Jul. 12, 1985 [JP] Japan .................................. 60-154534

[51] Int. Cl.$^5$ .............................................. C08J 9/18
[52] U.S. Cl. ...................................... 521/60; 521/56; 521/58
[58] Field of Search .............................. 521/56, 58, 60

[56] References Cited

U.S. PATENT DOCUMENTS

| | | | |
|---|---|---|---|
| 4,448,901 | 5/1984 | Senda et al. | 521/58 |
| 4,524,154 | 6/1985 | Maeda et al. | 521/58 |
| 4,540,718 | 10/1985 | Senda et al. | 521/58 |
| 4,617,322 | 10/1986 | Senda et al. | 521/58 |

*Primary Examiner*—Morton Foelak
*Attorney, Agent, or Firm*—Armstrong, Nikaido, Marmelstein, Kubovcik & Murray

[57] ABSTRACT

A pre-expanded particle of a non-crosslinked linear low density polyethylene having an average cell diameter as large as 120 to 1,200 μm which can be molded, without further imparting an expandability prior to molding or without aging under pressure, by heating in a closed mold permeable to a fluid heating medium such as steam to form a well bonded unitary cellular molded article having a good appearance, a high expansion ratio and improved heat resistance and mechanical property with a slight volumetric shrinkage.

3 Claims, 1 Drawing Sheet

PRE-EXPANDED PARTICLES OF NON-CROSSLINKED LINEAR LOW DENSITY POLYETHYLENE

This application is a division of application Ser. No. 143,301 filed Jan. 11, 1988, now abandoned which is a division of application Ser. No. 880,448 filed June 30, 1986, now abandoned.

BACKGROUND OF THE INVENTION

The present invention relates to pre-expanded particles of non-crosslinked linear low density polyethylene and a process for producing cellular foamed materials therefrom. More particularly, the invention relates to non-crosslinked linear low density polyethylene pre-expanded particles which are applicable, without further imparting expandability to the pre-expanded particles prior to molding, to a process for producing foams by heating pre-expanded particles with a heating medium such as steam in a mold which is able to be closed but unable to be sealed, in other words, in a mold which is able to be closed but is permeable to a fluid heating medium.

In a general process for producing foams by molding polyolefin resins in a mold, particles of the resins containing volatile blowing agents are pre-expanded by heating with steam or the like prior to molding. However, in case of polyethylene resins, it is very difficult to obtain pre-expanded particles which have a high expansion ratio and are less shrinked, because the melt viscosity of polyethylene resins remarkably drops at a temperature near the melting point thereof. Therefore, it is essential to crosslink the polyethylene resins. High pressure process low density polyethylene has been generally used as a starting material for preparing foams of crosslinked polyethylene resins because of good crosslinkability. The foamed articles of the crosslinked high pressure process low density polyethylene are superior in flexibility and buffer or cushioning action. However, for the reason that they are inferior in heat resistance and come short of rigidity, the pre-expanded particles of the crosslinked high pressure process polyethylene have the disadvantage that they must be used in a relatively low expansion ratio.

In order to eliminate the above-mentioned disadvantages, it is proposed to use a linear low density polyethylene (LLDPE) as a polymer material instead of the high pressure process low density polyethylene, as disclosed in Japanese Unexamined Patent Publication (Tokkyo Kokai) No. 50-187036 and Japanese Examined Patent Publication (Tokkyo Kokoku) No. 60-10047. According to these proposed processes, pre-expanded particles of non-crosslinked polyethylene are obtained and they can be used for molding in a mold. However, for obtaining foamed articles from such pre-expanded particles of non-crosslinked linear low density polyethylene, it is necessary, prior to molding the pre-expanded particles, to further impart the expandability to the pre-expanded particles (Japanese Unexamined Patent Publication No. 59-187036) or to conduct aging under pressure (Japanese Examined Patent Publication No. 60-10047).

The present inventors have found that such disadvantages of the known pre-expanded particles of non-crosslinked linear low density polyethylene result from the fact that the average diameter of cells in the pre-expanded particles is as small as about 90 $\mu$m or less. For example, the average cell diameter of the pre-expanded particles disclosed in Examples of Japanese Examined Patent Publication No. 60-10047, calculated from the number of cells, is less than 90 $\mu$m.

On the other hand, there is known, for example, as disclosed in DE-OS 2,107,683 or Japanese Examined Patent Publication No. 56-1344, a process for pre-expanding particles of polyolefin resins by dispersing the polyolefin resin particles and a volatile blowing agent into water in a pressure vessel such as autoclave, maintaining the dispersion at high temperature and high pressure and allowing the dispersion to release into a low pressure zone. Compared to a conventional process for pre-expansion using heated steam, this process can control the temperature of the resins upon expansion within a narrow range and, therefore, it enables pre-expansion of non-crosslinked polyethylene resins whose temperature range showing a viscoelasticity optimum to expansion is narrow. However, the mechanism of cell formation in the pre-expanded particles obtained by this process is different from that in the process for pre-expansion using heated steam, and it is difficult to control the cell diameter to a desired value. Japanese Unexamined Patent Publication No. 58-199125 discloses decreasing the diameter of cells in pre-expanded particles by using an inorganic fine powder such as talc or silica, but no technique for increasing the diameter of cells has been known.

The average diameter of cells of the pre-expanded particles of non-crosslinked linear low density polyethylene prepared according to the above process, namely by dispersing the non-crosslinked polymer particles and a volatile blowing agent into water in a pressure vessel followed by release of the particles present under high temperature and high pressure into a low pressure zone, varies depending on the manner of preparing the non-crosslinked linear low density polyethylene, the temperature and pressure at the time when the polymer particles are released from a pressure vessel into a low pressure zone, or the like, but is always as small as less than about 90 $\mu$m. The pre-expanded particles of non-crosslinked linear low density polyethylene having cells of such a small diameter have the problem that they cannot substantially be molded because the allowable range of heating condition for molding is very narrow. Even if possible, they provide only moldings extremely shrinked.

It is an object of the present invention to eliminate the drawbacks of the pre-expanded particles of non-crosslinked linear low density polyethylene.

A further object of the present invention is to provide pre-expanded particles of non-crosslinked linear low density polyethylene which can be molded, without requiring special procedures, by heating in a closed mold that is permeable to fluids.

A still further object of the present invention is to provide pre-expanded particles of non-crosslinked linear low density polyethylene which have a high expansion ratio and a good moldability and provide foams having a high expansion ratio and good heat resistance, mechanical property, flexibility and cushioning property with less shrinkage.

These and other objects of the present invention will become apparent from the description hereinafter.

SUMMARY OF THE INVENTION

The present inventors made a study to clear up the cause which decreases the diameter of cells or bubbles in pre-expansion of non-crosslinked linear low density polyethylene particles, and have found that metal salts of fatty acids such as calcium stearate and zinc stearate which are usually added to non-crosslinked linear low density polyethylene in the step of the preparation thereof as a neutralizing agent (absorbing agent) for corrosion prevention or as a lubricant, adversely affect the expansion of the polymer particles to make the diameter of cells small.

Further, it has been found that the cell diameter of the pre-expanded particle of non-crosslinked linear low density polyethylene can be made large by, upon releasing an aqueous liquid containing non-crosslinked linear low density polyethylene particles from a vessel to a lower pressure atmosphere than the pressure in the vessel to pre-expand the resin particles according to the before-mentioned known process, maintaining the low pressure atmosphere at a temperature of 40o to 110° C. so that the resin particles are gradually cooled.

By adjusting the average diameter of cells of pre-expanded particles within an appropriate range upon preparing pre-expanded particles from a non-crosslinked linear low density polyethylene, there can be obtained the pre-expanded particles which are moldable without the expandability being further imparted or without aging under pressure, and which have a good moldability such that the allowable range of heating condition for molding is sufficiently wide, the shrinkage of molded cellular articles is small and the molded articles coincident with a mold configuration are obtained, and which provide molded cellular articles having a high expansion ratio and excellent heat resistance, mechanical property, flexibility and cushioning property.

In accordance with the present invention, there is provided a pre-expanded particle of a non-crosslinked linear low density polyethylene having an average diameter of cells within the range of 120 to 1,200 $\mu$m, said linear low density polyethylene being a copolymer of ethylene and a $C_4$ to $C_{10}$ $\alpha$-olefin and having a melting point of 115° to 130° C., a density of 0.915 to 0.940 g/cm$^3$ and a melt index of 0.1 to 5 g/10 min.

The present invention also provides a process for preparing a foam which comprises charging preexpanded particles of a non-crosslinked linear low density polyethylene in a mold which is able to be closed but unable to be sealed, without further imparting expandability to the particles, and heating the particles in the mold with steam, thereby causing the particles to fuse together, said pre-expanded particles having an average diameter of cells within the range of 120 to 1,200 $\mu$m and said linear low density polyethylene being a copolymer of ethylene and a $C_4$ to $C_{10}$ $\alpha$-olefin and having a melting point of 115° to 130° C, a density of 0.915 to 0.940 g/cm$^3$ and a melt index of 0.1 to 5 g/10 min.

DETAILED DESCRIPTION

Figure 1:
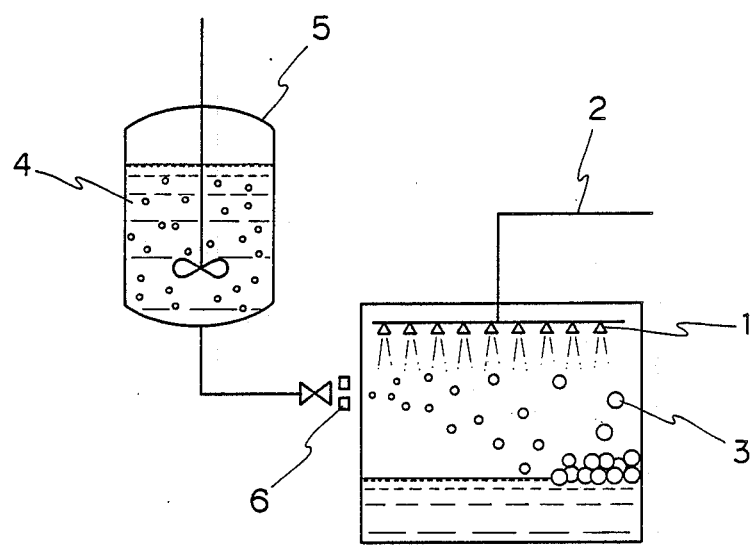
FIG. 1 is an illustrative view showing an embodiment of the preparation of the pre-expanded particles of the present invention.

The non-crosslinked linear low density polyethylene (non-crosslinked LLDPE) used in the present invention is a copolymer of ethylene and a $C_4$ to $C_{10}$ $\alpha$-olefin having a melting point of 115° to 130° C., a density of 0.915 to 0.940 g/cm$^3$ and a melt index (MI) of 0.1 to 5 g/10 min. LLDPE and a process for the preparation thereof are known in the field of synthetic resins.

Examples of the $\alpha$-olefin having 4 to 10 carbon atoms used as a comonomer are, for instance, 1-butene, 1-pentene, 1-hexane, 3,3-dimethyl-1-butene, 4-methyl-1-pentene, 4,4-dimethyl-1-pentene, 1-octene, and the like. The $\alpha$-olefins may be used alone or in admixture thereof. The content of the $\alpha$-olefin comonomer in the copolymer which ensures the density of the copolymer being within the above range, is usually from about 3 to about 12% by weight.

When the melting point of the copolymer is less than 115° C., the obtained foams are insufficient in heat resistance. When the melting point is more than 130° C., the properties of LLDPE are close to those of a high density polyethylene and consequently the molding is difficult.

The copolymer having a density of less than 0.915 g/cm$^3$ is hard to provide moldings having a high expansion ratio because of lack in rigidity of the resin. When the density of the copolymer is more than 0.940 g/cm$^3$, the impact resistance is bad, so the obtained foams become fragile, and also the copolymer approaches a high density polyethylene and is molded with difficulty.

When the melt index of the copolymer is less than 0.1 g/10 min., the copolymer is poor in fluidity in pre-expansion and accordingly it is difficult to achieve a high expansion ratio, and also the smoothness of the surface of moldings is lowered. On the other hand, when the melt index is more than 5 g/10 min., the fluidity becomes too large, so open cells are easy to be formed and also the diameter of cells is easy to become nonuniform.

The melting point of the copolymer as shown herein is a value measured by using a differential scanning calorimeter (DSC) and indicates a peak temperature in the endothermic curve obtained by raising the temperature of a polymer to 200° C. at a rate of 10° C./minute, cooling it to room temperature at a rate of 10° C./minute to crystallize, and then heating it again at a rate of 10° C./minute. The density of the copolymer as shown herein is a value measured according to Japanese Industrial Standard (JIS) K 6760 (method D in JIS K 7112). The melt index as shown herein is a value measured according to JIS K 6760 (JIS K 7210, 190° C., 2.16 kg load).

The non-crosslinked LLDPE used in the present invention may contain additives such as heat stabilizer, ultraviolet absorber, antistatic agent, flame retarder, coloring agent, inorganic powder and other usual additives, as occasion demands. In particular, in case of using the polymer in the form of particles having a relatively small particle size as in the present invention, re-granulation or re-pelletization by an extruder may be required and, therefore, it is preferable to add antioxidants such as phenol antioxidatns and/or phosphite antioxidants in an amount of 0.01 to 0.5% by weight based on LLDPE in order to prevent thermal deterioration of LLDPE.

Preferably, the non-crosslinked LLDPE particles used in the present invention have a weight of 0.5 to 20 mg per particle. When the particle weight is less than 0.5 mg/particle, there is a tendency that foams having a high expansion ratio are hard to obtain. When the particle weight is more than 20 mg/particle, the particles show a tendency to be molded in mold with difficulty because the pre-expanded particles obtained from such particles become too large.

The pre-expanded particles of non-crosslinked LLDPE of the present invention have an average cell diameter of 120 to 1,200 μm. The average diameter of cells in particles as shown herein is a value measured according to ASTM D 3576.

When the average cell diameter of the pre-expanded particles is less than 120 μm, molded articles remarkably shrink at the time of molding the pre-expanded particles in molds, and also the molding is difficult because the range of molding temperature is narrow. In particular, in the case where molding is conducted without further imparting the expandability to the pre-expanded particles prior to the molding or without aging under pressure, the pre-expanded particles having an average cell diameter of less than 120 μm cannot substantially provide good molded cellular articles, because the gas such as air in the cells of the pre-expanded particles escapes in large quantities from the cells during heating for molding and consequently the moldings greatly shrink due to pressure reduction in the cells and are not fit for practical use. On the other hand, when the average cell diameter is more than 1,200 μm, expansion in a high ratio is difficult, and also, since the cell diameter becomes nonuniform, moldings having a good appearance are difficult to obtain.

Preferably, the average diameter of cells in the pre-expanded particles is from 200 to 800 μm.

It is considered that by making the average cell diameter large as mentioned above, membranes surrounding the gas cells become thick and the release of the gas in the cells during heating for molding is decreased, thus shrinkage of moldings owing to reduction of pressure in the cells can be prevented.

The expansion ratio of the non-crosslinked LLDPE pre-expanded particles of the invention varies depending on purposes, density of the non-crosslinked LLDPE used, and the like, but preferably be from 10 to 40. For example, when moldings suitable as cushioning packaging materials are desired, preferable expansion ratio of the pre-expanded particles is from 10 to 30. In that case, if the non-crosslinked LLDPE having a density of 0.920 g/cm$^3$ is used as a raw material, the density of the pre-expanded particles is from about 0.092 to about 0.031 g/cm$^3$.

Usually, molded cellular articles obtained by molding the pre-expanded particles having an average cell diameter of 120 to 1,200 μm of the present invention in a mold have an average cell diameter of about 1.1 times that of the pre-expanded particles.

The following method is suitable for preparing the non-crosslinked LLDPE pre-expanded particles of the present invention. In a pressure vessel, non-crosslinked LLDPE particles and a volatile blowing agent are dispersed in water in the presence of a dispersing agent, and are heated to a temperature within −25° C. to +10° C. of the melting point of the resin particles to incorporate the blowing agent into the particles. While the temperature and pressure in the vessel are maintained constant at such high temperature and a pressure equal to or higher than the vapor pressure that the blowing agent indicates at that temperature, the mixture of the particles and water is released from the vessel to an atmosphere of a lower pressure than the pressure in the vessel, thereby expanding the resin particles to produce the pre-expanded particles of non-crosslinked LLDPE.

Metal salts of fatty acids such as calcium stearate and zinc stearate have been usually incorporated into the non-crosslinked LLDPE as a neutralizing agent (absorbing agent) for corrosion inhibition or as a lubricating agent in the stage of the preparation thereof, but they make the cells of pre-expanded particle small. Accordingly, the smaller the amount of metal salts of $C_8$ to $C_{18}$ fatty acids, e.g. calcium stearate and magnesium stearate, included in the non-crosslinked LLDPE used in the present invention, the average cell diameter tends to more increase. In the present invention, the fatty acid metal salts need not be included in the resin, and even if they are used for inhibiting corrosion or for adjusting the average cell diameter, it is preferable that the amount of the fatty acid metal salts is at most 0.1% by weight based on the resin, whereby the pre-expanded particles of non-crosslinked LLDPE having an average cell diameter over 120 μm can be obtained.

Accordingly, for controlling the average cell diameter of the pre-expanded particles within the range of 120 to 1,200 μm, the amount of the fatty acid metal salts is selected from 0 to 0.1 % by weight based on the non-crosslinked LLDPE. An inorganic fine powder such as talc or silica which is known in the art to act to decrease the diameter of the cells, may be added to the non-crosslinked LLDPE in an amount of 0 to 0.5% by weight based on the resin, as occasion demands, for the purpose of adjusting the cell diameter of the pre-expanded particles.

Hydrocarbons and halogenated hydrocarbons having a boiling point of −50° to 120° C. are used in the present invention as volatile blowing agents. Examples of the hydrocarbon and halogenated hydrocarbon blowing agents are, for instance, propane, butane, pentane, hexane, heptane, cyclopentane, cyclohexane, monochloromethane, dichloromethane, monochloroethane, trichloromonofluoromethane, dichlorodifluoromethane, dichloromonofluoromethane, trichlorotrifluoroethane, dichlorotetrafluoroethane, and the like. The blowing agents may be used alone or in admixture thereof. The blowing agents are incorporated into the non-crosslinked LLDPE particles in an amount of 5 to 40 parts by weight per 100 parts by weight of the resin. The amount of the volatile blowing agent used is decided so that the content of the blowing agent in the resin falls within the above range, with giving consideration to the kind of the blowing agent, desired expansion ratio, ratio of the volume of particles to the volume of space in a pressure vessel, etc. in the preparation of the pre-expanded particles wherein the polymer particles and the blowing agent are dispersed in water in the presence of a dispersing agent in a pressure vessel, maintained under high temperature and pressure conditions and released into a low pressure atmosphere.

The dispersing agent is used for preventing the polymer particles from agglomerating with each other. Examples of the dispersing agent are, for instance, a water-soluble polymer such as polyvinyl alcohol, methyl cellulose or poly-N-vinyl pyrrolidone, and a powder of a water-insoluble or slightly water-soluble inorganic material such as calcium phosphate, magnesium pyrophosphate, zinc carbonate, titanium dioxide or aluminum oxide. In case of using the inorganic powder, it is preferable to use a slight amount of a surface active agent as a dispersing assistant, e.g. anionic surface active agent such as sodium alkylbenzenesulfonate, sodium α-olefinsulfonate or sodium alkylsulfonate, in order to decrease the amount of the inorganic powder so that the pre-expanded particles are well fused together on heating for molding. Usually, the amounts of the inorganic powder and the anionic surface active agent are from 0.1 to 3 parts by weight and 0.001 to 0.5 part by weight, respectively, per 100 parts by weight of the polymer particles. The water-soluble polymer is employed usually in an amount of 0.1 to 5 parts by weight per 100 parts by weight of the polymer particles.

The amount of the non-crosslinked LLDPE particles to be dispersed in water is preferably from 10 to 100 parts by weight per 100 parts by weight of water from the viewpoint of good productivity, good dispersion stability and utility cost reduction.

The heating temperature in pre-expansion varies depending on the kinds of non-crosslinked LLDPE and volatile blowing agent and the desired expansion ratio, and is within the range of $-25°$ to $+10°$ C., preferably $-20°$ to $+5°$ C., of the melting point of the non-crosslinked LLDPE. For example, if the melting point is 120° C., the heating temperature for the aqueous dispersion of the polymer particles in the pressure vessel is selected from 95° to 125° C. When the heating temperature is lower than the above range, the expansion ratio is remarkably lowered, and when the heating temperature is higher than the above range, the number of closed cells in the resulting pre-expanded particle is decreased.

The volatile blowing agent can be impregnated in the non-crosslinked LLDPE particles in a usual manner, for example, by agitating the dispersion in the pressure vessel within the above temperature range, thereby bringing the polymer particles into contact with the blowing agent. At that time, the pressure in the vessel is maintained at a pressure equal to or higher than the vapor pressure that the volatile blowing agent indicates at the heating temperature.

While maintaining the temperature and pressure in the vessel constant, the aqueous liquid containing the non-crosslinked LLDPE particles is released from the vessel to an atmosphere of lower pressure than the pressure in the vessel, thus the pre-expanded particles of non-crosslinked LLDPE having an average cell diameter of 120 to 1,200 $\mu$m are obtained.

Preferably, the low pressure atmosphere to which the aqueous liquid containing the particles is released for expanding the particles, is maintained at a temperature of 40° to 110° C. so that the polymer particles are gradually cooled, whereby the diameter of the cells in the resulting pre-expanded particles can be increased. Heating of the low pressure atmosphere can be achieved, for instance, by spraying or injecting a hot water of 40° to 90° C. from a plurality of nozzles having small holes provided in the neighborhood of an orifice through which the aqueous liquid containing the polymer particles is released to the low pressure atmosphere. Such a spraying of hot water is advantageous because heating and washing of the resulting pre-expanded particles are simultaneously achieved.

Referring to FIG. 1 which shows one embodiment of the preparation of pre-expanded particles, non-crosslinked LLDPE particles are dispersed in water in a pressure vessel 5, and a blowing agent is introduced into the vessel with agitation. The temperature is elevated, and the resulting dispersion 4 is agitated for a prescribed period of time under high temperature and pressure conditions to incorporate the blowing agent into the particles. The aqueous dispersion 4 is then released through an orifice 6 into a chamber which is maintained at a pressure lower than that in the pressure vessel 5 and in which a plurality of spray nozzles 1 are arranged in a zone in the neighborhood of the orifice and at a level higher than the orifice. A hot water fed through line 2 is sprayed to the released particles 3 which are being expanded in the chamber to produce pre-expanded particles of the non-crosslinked LLDPE.

The non-crosslinked LLDPE pre-expanded particles of the present invention can be easily molded in a mold because the heating condition for molding is wide, and provide a unitary cellular molded article in which the particles are strongly adhered and welded to each other and which has a good appearance and a uniform distribution of density.

A conventional process for molding pre-expanded particles by heating them in a mold is applicable to the non-crosslinked LLDPE pre-expanded particles of the present invention.

For example, immediately after preparing the pre-expanded particles, or after aging the obtained pre-expanded particles for an appropriate period of time and drying, the pre-expanded particles are charged in a mold which is able to be closed but is unable to be hermetically closed, and are heated with a fluid heating medium such as steam at a temperature of about 105° to about 130° C. for about 3 seconds to about 2 minutes, thereby forming a unitary cellular molded article.

The pre-expanded particles of the present invention may be molded by a usual process as mentioned above after imparting the expandability to the pre-expanded particles under pressure, as occasion demands. Expandability can be imparted to the pre-expanded particles, for instance, by a process in which the inner pressure of the cells is increased by incorporating an inorganic gas such as nitrogen or air into the cells of the particles, a process in which the inner pressure of the cells is increased by compressing the pre-expanded particles with pressurized air or the like, or a process in which the pre-expanded particles are filled in a mold which is capable of changing the volume of cavity thereof, and then compressed to increase the intercellular pressure by decreasing the cavity volume of the mold.

Comparing with a conventional cellular molded article of high pressure process low density polyethylene, the cellular molded article prepared from the non-crosslinked LLDPE pre-expanded particles of the present invention shows a buffering or cushioning property of the same level as that of the conventional molded article with a higher expansion ratio (lower density) than that of the conventional molded article, and is superior in heat resistance and toughness, and is useful as cushioning material, wrapping or packaging material, container, or the like.

The present invention is more specifically described and explained by means of the following Examples, in which all % and parts are by weight unless otherwise noted. It is to be understood that the present invention is not limited to the Examples, and various changes and modifications may be made in the invention without departing from the spirit and scope thereof.

EXAMPLE 1

A non-crosslinked linear low density polyethylene (non-crosslinked LLDPE) containing no fatty acid metal salt, prepared by copolymerization of ethylene and 1-butene and having a melting point of 120° C., a melt index of 1.1 g/10 min., a density of 0.920 g/cm$^3$, a ratio of weight average molecular weight to number average molecular weight (Mw/Mn) of 5.1 measured by gel permeation chromatography, and a weight average molecular weight of $8.9 \times 10^4$, to which 0.008% of talc was added, was pelletized using an extruder.

A 1,000 liter pressure vessel equipped with a stirrer was charged with 100 parts (225 kg) of the obtained polymer pellets having a weight of 4.5 mg/pellet, 1.0 part of basic calcium tertiary phosphate powder and 0.006 part of sodium $C_{14}$-$C_{16}$ n-paraffin sulfonate as dispersing agent, and 300 parts of water, and they were stirred. To the resulting aqueous dispersion was added 45 parts of dichlorofluoromethane with stirring, and the temperature of the dispersion was raised to 116° C. At that time, the inner pressure of the vessel was 27 kg/cm$^2$G (gauge pressure, hereinafter the same). A valve provided at a lower part of the vessel was opened to release the mixture of the polymer particles and water into an atmosphere of ordinary pressure through a single circular orifice having an inner diameter of 4 mm in an orifice plate provided after the valve. During the release the inner pressure of the vessel was maintained at 27 kg/cm$^2$G by supplying dichlorodifluoromethane.

The thus obtained pre-expanded particles had an average expansion ratio of 23 and an average cell diameter of 210 μm. Also, they did not adhere to each other and were uniform in size.

The pre-expanded particles were dried at room temperature for 24 hours, and filled in a mold having a single cavity of 900 mm×600 mm×60 mm in size attached to a SC-10B molding machine made by Toyo Kikai Kinzoku Kabushiki Kaisha. The particles were heated for 20 seconds by steam of 1.0 kg/cm$^2$G to fuse together. After cooling, the molded article was taken out of the mold, aged at 80° C. for 20 hours and dried. The obtained cellular molded article had a density of 0.030 g/cm$^3$, and was in the state that the particles strongly adhered and welded to each other to form a unitary molded article. The surface of the molded article was smooth.

The volumetric shrinkage of the molded articles prepared from the above pre-expanded particles by heating at a steam pressure of 1.0 to 1.1 kg/cm$^2$G was below 10%.

EXAMPLE 2

An aqueous dispersion of the non-crosslinked LLDPE pellets was prepared and the blowing agent was impregnated in the pellets in the same manner as in Example 1. The aqueous dispersion 4 was released, as shown in FIG. 1, from orifice 6 into an atmosphere of ordinary pressure, while spraying a hot water of 60° C. downward to particles 3 from 100 spray nozzles 1 arranged in the zone 30 cm to 1.5 m from the orifice 6. The hot water was supplied through line 2.

The obtained pre-expanded particles had an average expansion ratio of 26 and an average cell diameter of 320 μm.

The pre-expanded particles were subjected to molding at a steam pressure of 0.9 to 1.2 kg/cm$^2$G in the same manner as in Example 1. The particles well fused together to form a unitary cellular molded article having a smooth surface. The volumetric shrinkage was below 10

COMPARATIVE EXAMPLE 1

Pre-expanded particles were prepared in the same manner as in Example 1 except that the non-crosslinked LLDPE contained 0.15% of calcium stearate. The pre-expanded particles had an average expansion ratio of 25 and an average cell diameter of 50 μm.

The pre-expanded particles were subjected to molding in the same manner as in Example 1. Under the heating condition of 0.5 to 1.5 kg/cm$^2$G in steam pressure, the melt bonding of the particles was very bad and the volumetric shrinkage was over 20%, and molded articles having a rough surface were only obtained.

EXAMPLES 3 TO 7 AND COMPARATIVE EXAMPLES 2 AND 3

The preparation and molding of pre-expanded particles were made in the same manner as in Example 1 except that the content of calcium stearate in the non-crosslinked LLDPE used was altered and no talc was added to the polymer upon the pelletization by an extruder The results are shown in Table 1.

In Table 1, the proper steam pressure range in molding shows an allowable molding condition. When the average cell diameter is less than 120 μm as in conventional non-crosslinked LLDPE pre-expanded particles, the difference between the upper and lower limits of the proper steam pressure is as narrow as less than 0.05 kg/cm$^2$G, thus the molding becomes difficult or impossible.

TABLE 1

| | Average Cell diameter (μm) | Average expansion ratio | Moldability | Proper steam pressure in molding (kg/cm$^2$G) | Content of calcium stearate (%) |
|---|---|---|---|---|---|
| Com. Ex. 2 | 1300 | 15 | bad in appearance | 0.8–1.2 | 0 |
| Ex. 3 | 1000 | 16 | good | 0.8–1.2 | 0 |
| Ex. 4 | 760 | 21 | good | 0.8–1.2 | 0.01 |
| Ex. 5 | 430 | 23 | good | 0.9–1.2 | 0.03 |
| Ex. 6 | 200 | 26 | good | 1.1–1.2 | 0.06 |
| Ex. 7 | 120 | 27 | good | 1.1–1.15 | 0.09 |
| Com. Ex. 3 | 80 | 29 | impossible | none | 0.12 |

EXAMPLE 8

A non-crosslinked LLDPE containing no fatty acid metal salt, prepared by copolymerization of ethylene and 1-butene and having a melting point of 117° C., a melt index of 0.8 g/10 min., a density of 0.920 g/cm$^3$, a Mw/Mn ratio of 17.3 and a Mw of 8.8 x 10$^4$, to which 0.01% of talc was added, was pelletized to give pellets having a weight of 5 mg/pellet.

Pre-expanded particles of the non-crosslinked LLDPE were prepared in the same manner as in Example 1 except that the above pellets were used and the heating temperature for impregnation of the blowing agent in the pressure vessel was 113° C. The pre-expanded particles had an average expansion ratio of 24 and an average cell diameter of 340 μm.

The molding of the pre-expanded particles was conducted in the same manner as in Example 1. Under the heating condition of 0.8 to 1.1 kg/cm²G in steam pressure, the particles well bonded together to form a good unitary cellular molded article having a smooth surface, and the volumetric shrinkage was below 10%.

EXAMPLES 9 TO 12

Pre-expanded particles of non-crosslinked LLDPE were prepared and molded in the same manner as in Example 1 except that non-crosslinked LLDPE prepared by using α-olefin comonomers shown in Table 2 was used.

The results are shown in Table 2.

TABLE 2

|  | Example No. | | | |
| --- | --- | --- | --- | --- |
|  | 9 | 10 | 11 | 12 |
| Comonomer | 4-methyl-1-pentene | 4-methyl-1-pentene | 1-octene | 1-octene |
| Melting point (°C.) | 122 | 120 | 122 | 126 |
| Melt index (g/10 min.) | 2.1 | 2.1 | 2.0 | 1.1 |
| Density (g/cm³) | 0.930 | 0.920 | 0.920 | 0.935 |
| Content of calcium stearate (%) | 0.06 | 0.02 | 0.03 | 0.03 |
| Content of talc (%) | 0 | 0 | 0 | 0 |
| Impregnation of blowing agent | | | | |
| Heating temperature (°C.) | 118 | 117 | 116 | 120 |
| Inner pressure of vessel (kg/cm²G) | 27 | 29 | 28 | 28 |
| Average expansion ratio | 22 | 24 | 26 | 21 |
| Average cell diameter (μm) | 120 | 180 | 260 | 290 |
| Moldability | good | good | good | good |
| Proper steam pressure in molding (kg/cm²G) | 1.4–1.45 | 1.1–1.20 | 0.7–0.8 | 1.4–1.5 |

It is observed in Tables 1 and 2 that the non-crosslinked LLDPE pre-expanded particles of the present invention can be subjected to molding under widen heat molding conditions with high expansion ratio and without imparting an expandability to the pre-expanded particles prior to molding or without aging the pre-expanded particles under pressure, and provide a cellular molded article having a good appearance which is less shrinked as compared with conventional non-crosslinked polyethylene pre-expanded particles.

In addition to the ingredients used in the Examples, other ingredients can be used in the Examples as set forth in the specification to obtain substantially the same results.

What is claimed is:

1. A pre-expanded particle of a non-crosslinked linear low density polyethylene having an average cell diameter in the range of 320 to 1,200 μm and prepared from a copolymer of ethylene and a $C_4$–$C_{10}$ α-olefin, said copolymer having a melting point of 115 to 130° C., a density of 0.915 to 0.940 g/cm³ and a melt index of 0.1 to 5 g/10 min.

2. The pre-expanded particle of claim 1, wherein said non-crosslinked linear low density polyethylene contains at most 0.1% by weight of $C_8$–$C_{18}$ fatty acid metal salt.

3. The pre-expanded particle of claim 1, wherein the average cell diameter is from 320 to 800 μm.

* * * * *